(12) United States Patent
Lee et al.

(10) Patent No.: US 7,773,887 B2
(45) Date of Patent: Aug. 10, 2010

(54) SINGLE WAVELENGTH BI-DIRECTIONAL ROF LINK APPARATUS OR SIGNAL TRANSMISSION IN TDD WIRELESS SYSTEM

(75) Inventors: Jae-Hoon Lee, Seoul (KR); Byung-Jik Kim, Seongnam-si (KR); Seong-Taek Hwang, Pyeongtaek-si (KR); Sang-Ho Kim, Seoul (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 738 days.

(21) Appl. No.: 11/642,260

(22) Filed: Dec. 20, 2006

(65) Prior Publication Data
US 2007/0258432 A1 Nov. 8, 2007

(30) Foreign Application Priority Data
May 3, 2006 (KR) .................. 10-2006-0040051

(51) Int. Cl.
H04B 10/00 (2006.01)
H04B 10/24 (2006.01)
H04J 14/00 (2006.01)
(52) U.S. Cl. .................. 398/115; 398/41; 398/52
(58) Field of Classification Search ............ 398/41, 398/52, 115
See application file for complete search history.

(56) References Cited

U.S. PATENT DOCUMENTS 5,523,870 A * 6/1996 Suzuki et al. .............. 398/100
5,646,758 A * 7/1997 Miki et al. ................. 398/100
6,493,127 B2 * 12/2002 Gopalakrishnan ........... 359/254
7,043,271 B1 * 5/2006 Seto et al. ................. 455/562.1
2003/0228151 A1 * 12/2003 Niiho et al. ................ 398/115
2007/0201873 A1 * 8/2007 Buabbud et al. ............. 398/66

FOREIGN PATENT DOCUMENTS

| GB | 2278971 A | * 12/1994 |
| KR | 2005-107044 | 11/2005 |
| KR | 2006-36656 | 5/2006 |
| KR | 2006-10963 | 6/2006 |

* cited by examiner

Primary Examiner—Nathan M Curs
(74) Attorney, Agent, or Firm—Cha & Reitter, LLC

(57) ABSTRACT

A single wavelength bi-directional RoF link apparatus for signal transmission in a TDD wireless system includes a main donor for receiving an RF signal of downstream data from an upper layer, electrooptic converting the received RF signal to an optical signal, and transmitting the converted optical signal via an optical fiber in response to a TDD switching signal received from the upper layer, or receiving an optical signal of upstream data via the optical fiber, opto-electric converting the received optical signal to an RF signal in response to the TDD switching signal received from the upper layer, and transmitting the converted optical signal to the main donor; and a remote for receiving the optical signal of the downstream data via the optical fiber from the main donor, opto-electric converting the received optical signal to an RF signal, and emitting the converted RF signal to a terminal via an antenna in response to a TDD switching signal generated by a switch timing signal generation circuit, or receiving an RF signal of upstream data from the terminal, electro-optic converting the received RF signal to an optical signal in response to the TDD switching signal generated by the switch timing signal generation circuit, and transmitting the converted optical signal to the main donor via the optical fiber.

16 Claims, 5 Drawing Sheets

SINGLE WAVELENGTH BI-DIRECTIONAL ROF LINK APPARATUS OR SIGNAL TRANSMISSION IN TDD WIRELESS SYSTEM

CLAIM OF PRIORITY

This application claims the benefit of the earlier filing date, under 35 U.S.C. §119, to that patent application entitled "Single Wavelength Bi-Directional RoF Link Apparatus for Signal Transmission in TDD Wireless System," filed in the Korean Intellectual Property Office on May 3, 2006 and assigned Serial No. 2006-40051, the contents of which are incorporated herein by reference.

BACKGROUND OF THE INVENTION

1. Field of the Invention

The present invention relates generally to a radio-over-fiber (RoF) communications and in particular, to an RoF link apparatus for upstream/downstream wireless signal transmission in a mobile communication system using a Time Division Multiplexing (TDD) method.

2. Description of the Related Art

Typically, a mobile communication system uses repeaters to expand cell coverage thereof. Further, in underground or the buildings, where electronic wave cannot reach, optical repeaters using an optical link are widely used. The optical link is used, in one direction, to transmit a wireless signal to an optical repeater which is further used to transmit a wireless signal in an existing mobile communication system, e.g., a Code Division Multiple Access (CDMA) or a Wideband CDMA (WCDMA) system.

The mobile communication system uses a Frequency Division Duplexing (FDD) method using divided frequencies and a Time Division Duplexing (TDD) method using divided times as a duplexing method for distinguishing an uplink and a downlink for wireless signal transmission.

The CDMA and WCDMA systems mainly use the FDD method, and Wireless Broadband Internet (WiBro) and 4$^{th}$ Generation Mobile Communication (4G) systems, which are up-to-date mobile communication systems consider the TDD method.

The TDD method is considered as a method suitable for next-generation mobile communication systems using multiple antennas since an upstream/downstream transmission size varies freely and channel characteristics of upstream and downstream wireless signals are substantially the same. The TDD method has a different characteristic from the FDD method in that an upstream signal is transmitted in a predetermined time and a downstream signal is transmitted in the other time.

FIG. 1 is a block diagram of a conventional radio-over-fiber (RoF) link apparatus for upstream/downstream wireless signal transmission/reception in a TDD mobile communication system.

Referring to FIG. 1, the conventional RoF link apparatus includes a main donor 120 and a remote 130 connected to the main donor 120 via an optical fiber 140.

The main donor 120 existing in a Central Station (CS) is connected to an Access Point (AP) 110 via a Radio Frequency (RF) cable, electro-optic converts an RF signal received from the AP 110 to an optical signal and transmits the converted optical signal to the remote 130 of an optical repeater via the optical fiber 140, and opto-electric converts an optical signal received from the remote 130 to an RF signal and transmits the converted RF signal to the AP 110 via the RF cable. The AP 110, which is a base station of the mobile communication system, transmits data received from a Packet Access Router (PAR: not shown) to a terminal (not shown) in a wireless manner, and has a low-power RF/Intermediate Frequency (IF) module and controller function, an Orthogonal Frequency Division Multiplexing (OFDM)/TDD packet scheduling and channel multiplexing function, a Media Access Control (MAC) frame variable control function according to a service characteristic and a radio wave environment, a 50 Mbps-level high-speed traffic real-time control function, and a handover function.

The remote 130 of the optical repeater opto-electric converts an optical signal received from the main donor 120 to an RF signal and transmits the converted RF signal to a terminal (not shown) via an antenna, and electro-optic converts an RF signal received from the terminal to an optical signal and transmits the converted optical signal to the main donor 120 via the optical fiber 140.

Configurations of the main donor 120 and the remote 130 will now be described in more detail. The main donor 120 includes a Low Noise Amplifier (LNA) 121, an electro-optic converter (E/O) 122, a Wavelength Division Multiplexer (WDM) 123, an opto-electric converter (O/E) 124, and a High Power Amplifier (HPA) 125. The remote 130 includes a WDM 131, an O/E converter 132, a coupler 133, an HPA 134, a switch 135, an LNA 136, an E/O converter 137, and a switch timing signal generation circuit 138.

Although it is not shown, the main donor 120 can expand coverage of optical repeaters by connecting to a plurality of remotes via the optical fiber 140. To do this, the main donor 120 can include a signal divider (not shown) having multiple channels and a signal combiner (not shown), wherein the signal divider divides an RF signal received from the AP 110 and transmits the divided RF signals to corresponding LNA 121, and the signal combiner combines an RF signal received from the HPA 125 with outputs of other remotes 130 and transmits the combined RF signal to the AP 110 via the RF cable.

Each of the WDMs 123 and 131 is a device for allowing an optical fiber channel to be used as a plurality of communication paths by dividing the optical fiber channel into a plurality of channels using a wavelength of light, and can operate as a wavelength division multiplexer (MUX) for transmitting signals having a plurality of optical wavelengths by carrying the signals on a single optical fiber when an optical signal is transmitted or can operate as a wavelength division demultiplexer (DEMUX) for distributing signals having a plurality of optical wavelengths carried on a single optical fiber when an optical signal is received.

The E/Os 122 and 137 can be implemented using a laser diode, and the O/Es 124 and 132 can be implemented using a photo diode.

When the coupler 133 extracts a portion of an RF signal, the switch timing signal generation circuit 138 generates a switch timing signal for controlling the switch 135 by distinguishing downstream data and upstream data and provides the generated switch timing signal to the switch 135. An internal configuration of the switch timing signal generation circuit 138 will be described in more detail with reference to FIG. 2.

Data transmission procedures of an uplink and a downlink using the components of the main donor 120 and the remote 130 will now be described in detail. For the downlink, an RF signal transmitted via the RF cable from the AP 110, which is an upper layer, is input to the LNA 121 of the main donor 120.

The LNA 121 of the main donor 120 substantially cancels a noise component of the RF signal, amplifies a signal component of the RF signal, and outputs the substantially noise-cancelled and signal-amplified RF signal to the E/O 122. The E/O 122 converts the input RF signal to an optical signal and outputs the converted optical signal to the WDM 123. The WDM 123 transmits a plurality of optical signals input from the E/O 122 to the remote 130 via the optical fiber 140.

The WDM 131 of the remote 130, which has received an optical signal from the main donor 120, demultiplexes the optical signal and outputs the demultiplexed optical signals to the O/E 132. The O/E 132 converts the input optical signal to an RF signal and outputs the converted RF signal to the HPA 134.

The HPA 134 amplifies the input RF signal up to an effective power enough to transmit it in a wireless manner and outputs the amplified RF signal to the switch 135. The switch 135 emits the input RF signal to the terminal via the antenna.

For the uplink, when an RF signal is received from the terminal via the antenna of the remote 130, the LNA 136 substantially cancels a noise component of the RF signal, amplifies a signal component of the RF signal, and outputs the substantially noise-cancelled and signal-amplified RF signal to the E/O 137. The E/O 137 converts the input RF signal to an optical signal and outputs the converted optical signal to the WDM 131. The WDM 131 transmits the optical signals input from the E/O 137 to the main donor 120 via the optical fiber 140.

The WDM 123 of the main donor 120, which has received the optical signal from the remote 130, demultiplexes the optical signal into a plurality of optical signals and outputs the demultiplexed optical signals to the O/E 124. The O/E 124 converts the input optical signal into an RF signal and outputs the converted RF signal to the HPA 125.

The HPA 125 amplifies the input RF signal up to an effective power sufficient to transmit it to the AP 110 and transmits the amplified RF signal to the AP 110 via the RF cable.

The coupler 133 of the remote 130 extracts a portion of the RF signal transferred from the O/E 132 to the HPA 134 and outputs the extracted RF signal to the switch timing signal generation circuit 138. The switch timing signal generation circuit 138 generates a switch timing signal for RF signal transmission by analyzing the extracted RF signal and outputs the generated switch timing signal to the switch 135. In response to the input switch timing signal, if a downstream signal is input, the switch 135 emits the downstream signal to the terminal via the antenna, and if an upstream signal is input, the switch 135 cuts off a path connected to the HPA 134 and sets a path for providing the upstream signal to the LNA 136.

FIG. 2 is a block diagram of the switch timing signal generation circuit 138 illustrated in FIG. 1.

Referring to FIG. 2, the switch timing signal generation circuit 138 includes a divider 210, a level detector 220, a variable gain amplifier (VGA) 230, a log-scale amplifier 240, a pulse-shape generator 250, a comparator 260, a reference pulse-shape generator 270, a phase tuning circuit 280, and a timing controller 290 as internal components.

A process of generating a switch timing signal in the switch timing signal generation circuit 138 will now be described in detail.

After the coupler 133 extracts a portion of an RF signal and outputs the extracted RF signal to the divider 210, the divider 210 distributes the RF signal to the level detector 220 and the VGA 230. The level detector 220 measures a level of the RF signal and outputs the measured level to the VGA 230. The VGA 230 maintains an output signal to a constant level based on the measured level input from the level detector 220.

The log-scale amplifier 240 converts a signal variation input from the VGA 230 from a linear scale to a dB scale and outputs the scale-converted signal variation to the pulse-shape generator 250. The pulse-shape generator 250 generates a pulse-shape signal using the input signal and outputs the generated pulse-shape signal to the comparator 260.

The reference pulse-shape generator 270 generates a reference pulse-shape signal for determining a frame start position of the RF signal by correlating with the pulse-shape signal generated by the pulse-shape generator 250 and outputs the generated reference pulse-shape signal to the comparator 260.

The comparator 260 performs a correlation between the pulse-shape signal input from the pulse-shape generator 250 and a reference pulse-shape signal input from the reference pulse-shape generator 270. That is, the comparator 260 correlates the two signals and outputs a correlation result to the timing controller 290. The timing controller 290 determines the frame start position of the RF signal extracted by the coupler 133 by analyzing the correlation result input from the comparator 260 and calculates a start time of the downstream or upstream signal based on the determined frame start position.

The timing controller 290 generates a switch timing signal for controlling the switch 135 using the calculated start time information of the downstream or upstream signal and outputs the generated switch timing signal to the switch 135.

The phase tuning circuit 280 receives phase information of the pulse-shape signal generated by the pulse-shape generator 250 from the comparator 260 and tunes a phase of the reference pulse-shape signal.

When the switch timing signal generation circuit 138 generates a switch timing signal through the above-described process and outputs the generated switch timing signal to the switch 135, the switch timing signal controls the switch 135 by distinguishing an RF signal input to the switch 135 as either a downstream signal or an upstream signal. That is, it a downstream signal is input from the HPA 134 of the remote 130 to the switch 135, the switch timing signal controls the switch 135 to emit the downstream signal to the terminal via the antenna, and if an upstream signal is input from the terminal via the antenna, the switch timing signal controls the switch 135 to provide the upstream signal to the LNA 136 of the remote 130. Thus, the switch 135 can selectively provide a path of a downstream signal or an upstream signal by controlling the opening or closing thereof in response to the switching timing signal.

As described above the conventional RoF link apparatus used in a TDD mobile communication system uses a method of assigning a single wavelength to an upstream signal and second single wavelength to a downstream signal as in a conventional RoF link apparatus used in an FDD mobile communication system.

However, the conventional RoF link apparatus used to connect a wireless upstream/downstream signal to an optical repeater in a TDD mobile communication system transmits the upstream and downstream signals by assigning different wavelengths to them as in transmission of an FDD wireless upstream/downstream signal. That is, for signal transmission to a single optical repeater, two wavelengths must be used, and in order to identify the two wavelengths, the MUX/DEMUX of the WDM 123 or 131 must be used.

In order to use optical transmitters using different wavelengths, the two optical transmitters must easily identify the wavelengths used for upstream and downstream signals. In addition, when a plurality of optical repeater signals are transmitted using a single optical fiber, a WDM scheme is used, and due to this, 2×N wavelengths must be used in order to transmit signals to N optical repeaters, resulting in high cost.

SUMMARY OF THE INVENTION

An object of the present invention is to substantially solve at least the above problems and/or disadvantages and to provide at least the advantages below. Accordingly, an object of the present invention is to provide a single wavelength bi-directional RoF link apparatus using a signal wavelength to connect upstream/downstream data to optical repeaters in a TDD mobile communication system.

According to one aspect of the present invention, there is provided a single wavelength bi-directional RoF link apparatus for signal transmission in a TDD wireless system, the RoF link apparatus comprising a main donor for receiving an RF signal of downstream data from an upper layer, converting the received RF signal to an optical signal, and transmitting the converted optical signal via an optical fiber in response to a TDD switching signal received from the upper layer, or receiving an optical signal of upstream data via the optical fiber, converting the received optical signal to an RF signal in response to the TDD switching signal received from the upper layer, and transmitting the converted optical signal to the main donor and a remote for receiving the optical signal of the downstream data via the optical fiber from the main donor, converting the received optical signal to an RF signal, and emitting the converted RF signal to a terminal via an antenna in response to a TDD switching signal generated by a switching timing signal generation circuit, or receiving an RF signal of upstream data from the terminal, converting the received RF signal to an optical signal in response to the TDD switching signal generated by the switch timing signal generation circuit, and transmitting the converted optical signal to the main donor via the optical fiber.

BRIEF DESCRIPTION OF THE DRAWINGS

The above features and advantages of the present invention will become more apparent from the following detailed description when taken in conjunction with the accompanying drawing in which.

DETAILED DESCRIPTION

Exemplary embodiments of the present invention will be described herein below with reference to the accompanying drawings. For the purposes of clarity and simplicity, well-known functions or constructions are not described in detail as they would obscure the invention in unnecessary detail.

The present invention illustrates an optical link apparatus for converting downstream data received from an AP, which is an upper layer, to an optical signal and transmitting the converted optical signal from a main donor existing in a CS to a remote optical repeater, and an optical link apparatus for converting upstream data received by the remote via an antenna to an optical signal and transmitting the converted optical signal from the remote to the main donor.

A single wavelength bi-directional RoF link apparatus according to a preferred embodiment of the present invention can be preferably used for an optical repeater of a mobile communication system and a device for transmitting a upstream/downstream wireless signal via an antenna.

Figure 1:
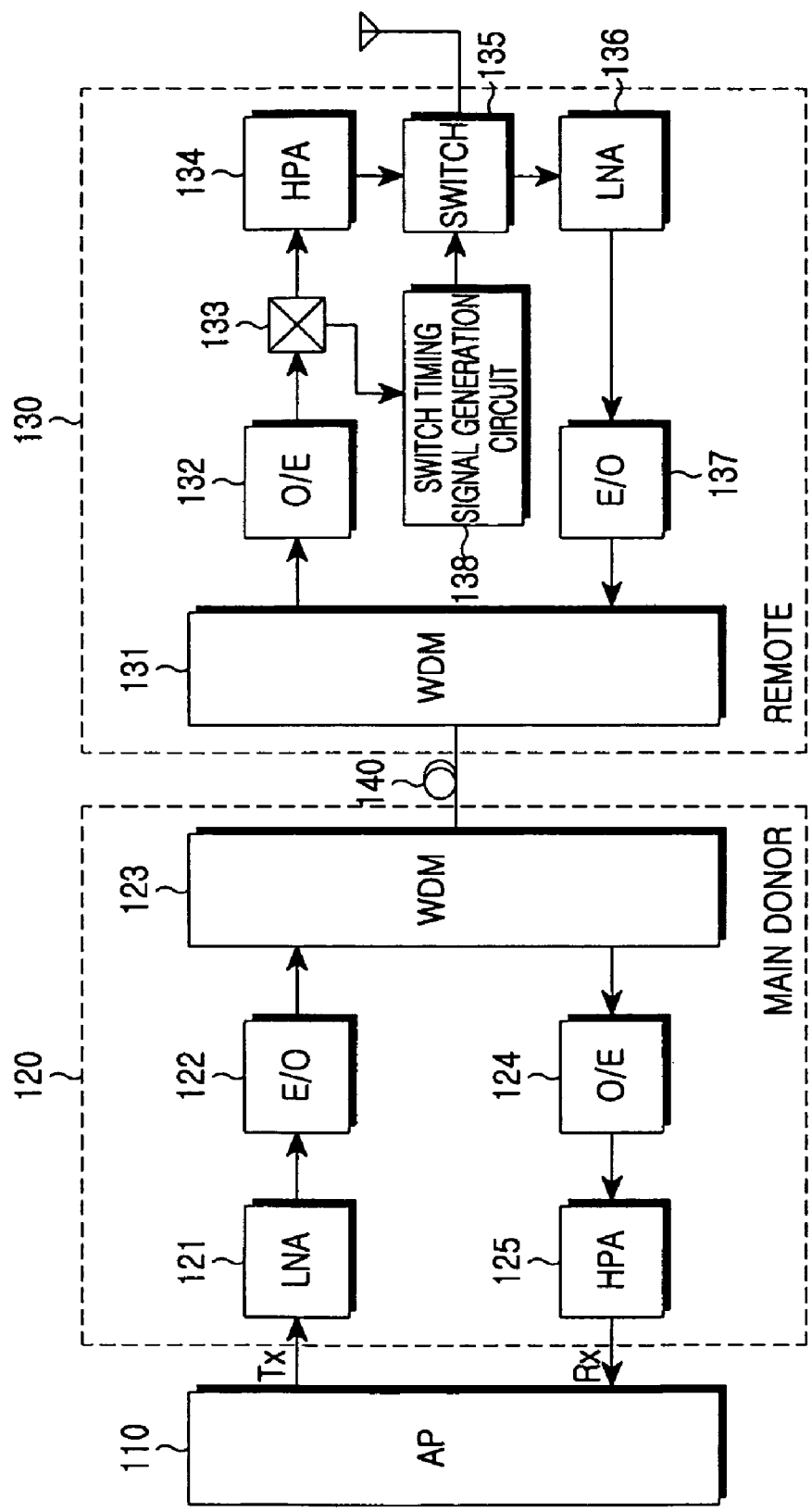
FIG. 1 is a block diagram of a conventional RoF link apparatus for upstream/downstream wireless signal transmission/reception in a TDD mobile communication system.
Figure 2:
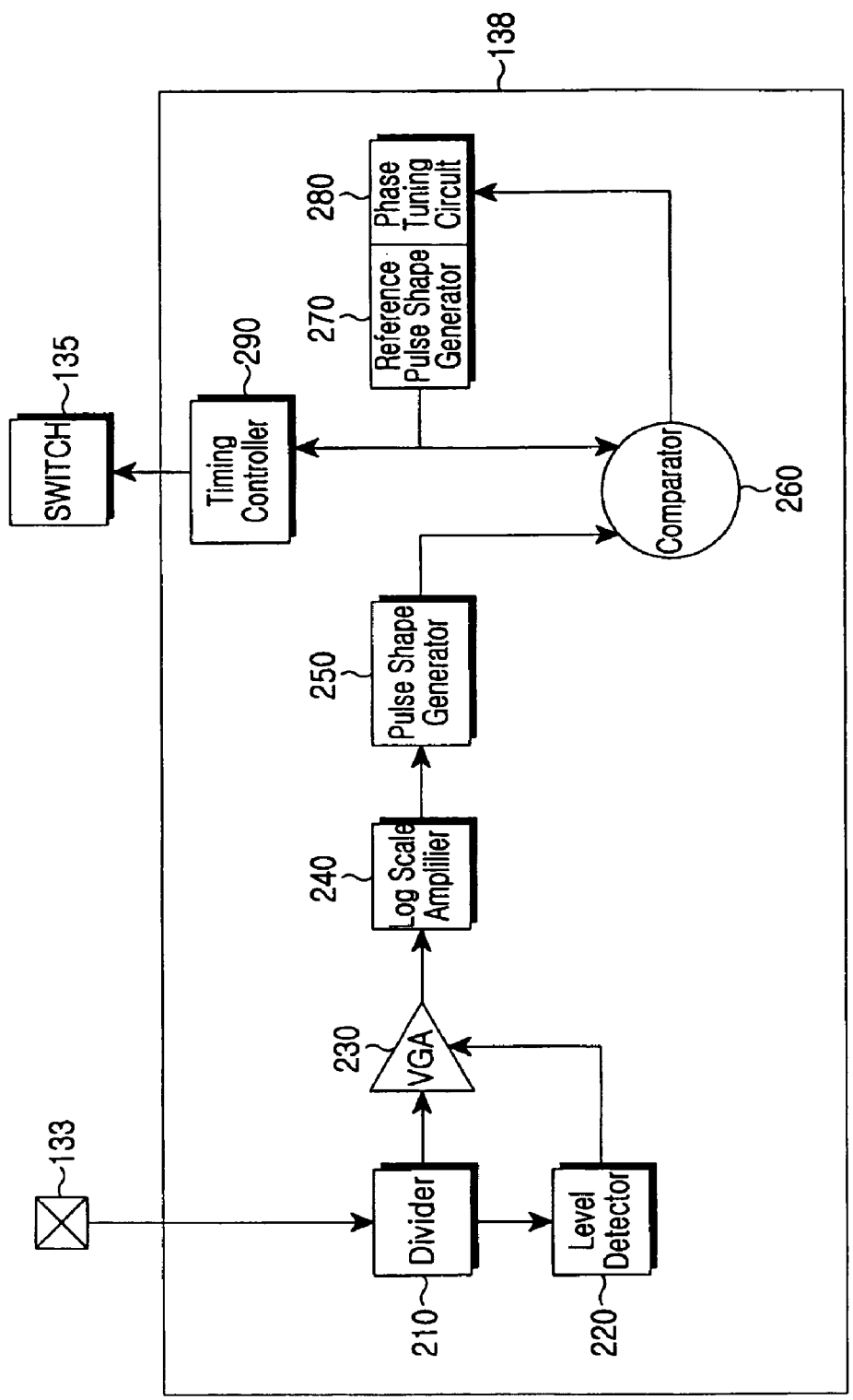
FIG. 2 is a block diagram of a switch timing signal generation circuit illustrated in FIG. 1.
Figure 3:
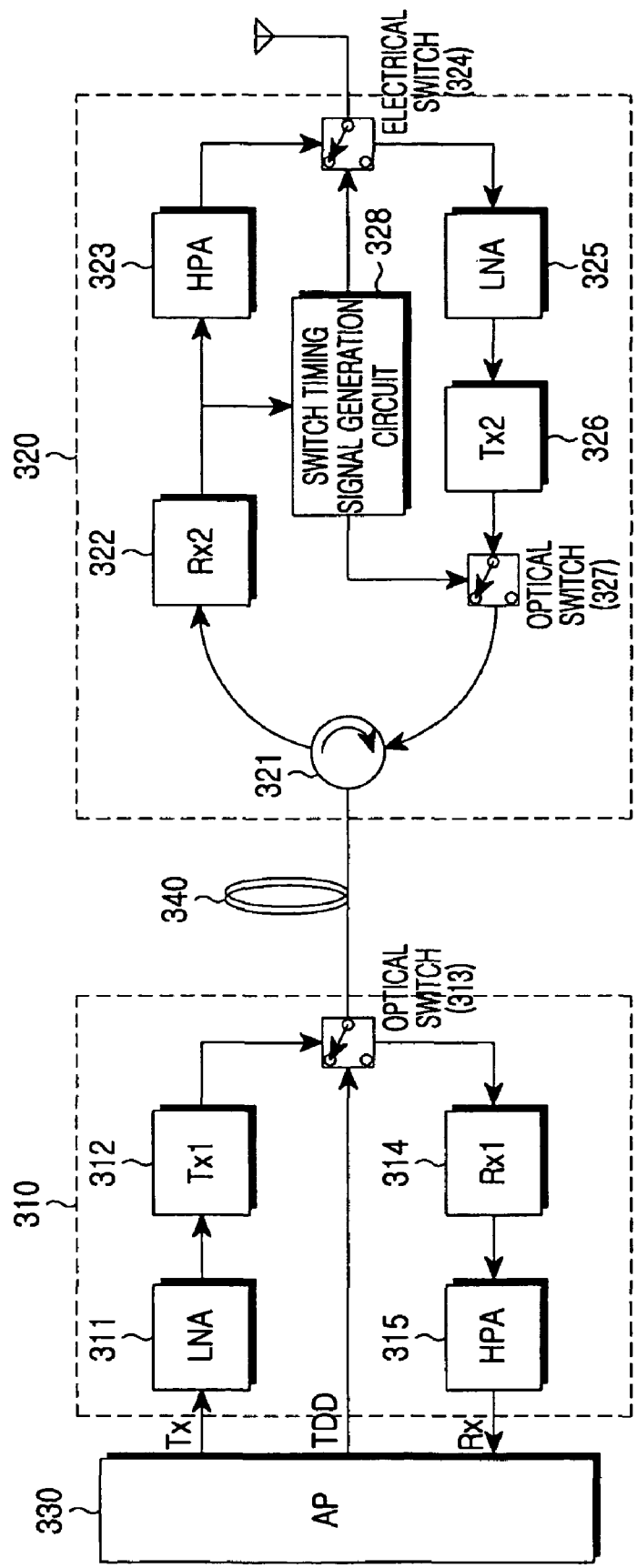
FIG. 3 is a block diagram of a single wavelength bi-directional RoF link apparatus for signal transmission in a TDD wireless system according to a preferred embodiment of the present invention.

FIG. 3 is a block diagram of a single wavelength bi-directional RoF link apparatus for signal transmission in a TDD wireless system according to a preferred embodiment of the present invention.

Referring to FIG. 3, the RoF link apparatus according to the current embodiment includes a main donor 310 and a remote 320 connected to the main donor 310 via an optical fiber 340.

The main donor 310 existing in a Central Station (CS) is connected to an Access Point (AP) 330 via an RF cable, converts an RF signal received from the AP 330 to an optical signal and transmits the converted optical signal to the remote 320 of an optical repeater via the optical fiber 340, and further converts an optical signal received from the remote 320 to an RF signal and transmits the converted RF signal to the AP 330 via the RF cable. The AP 330 is a base station of a mobile communication system, transmits data received from a Packet Access Router (PAR: not shown) to a terminal (not shown) in a wireless manner, and has a low-power RF/IF module and controller function, an OFDM/TDD packet scheduling and channel multiplexing function, a MAC frame variable control function according to a service characteristic and a radio wave environment, a 50 Mbps-level high-speed traffic real-time control function, and a handover function. The AP 330 transmits downstream data to the main donor 310 and receives upstream data from the main donor 310. In addition, the AP 330 provides a TDD switching signal for time division of the upstream and downstream data to the main donor 310.

The remote 320 of the optical repeater opto-electric converts an optical signal received from the main donor 310 to an RF signal and transmits the converted RF signal to a terminal (not shown) via an antenna, and electro-optic converts an RF signal received from the terminal to an optical signal and transmits the converted optical signal to the main donor 310 via the optical fiber 340.

Configurations of the main donor 310 and the remote 320 will now be described in more detail. The main donor 310 includes a first Low Noise Amplifier (LNA) 311, a first optical transmitter (Tx1) 312, a first optical switch 313, a first optical receiver (Rx1) 314, and a First High Power Amplifier (HPA) 315 as internal components. The remote 320 includes an optical circulator 321, an optical receiver (Rx2) 322, a HPA 323, an electrical switch 324, a LNA 325, a second optical transmitter (Tx2) 326, a optical switch 327, and a switch timing signal generation circuit 328 as internal components.

Although it is not shown, the main donor 310 can expand coverage of optical repeaters by connecting to a plurality of remotes via the optical fiber 340. To do this, the main donor 310 can include a signal divider (not shown) having multiple channels and a signal combiner (not shown), wherein the signal divider divides an RF signal received from the AP 330 and transmits the divided RF signals to the LNA 311, and the signal combiner combines an RF signal received from the HPA 315 with outputs of other remotes 320 and transmits the combined RF signal to the AP 330 via the RF cable.

The Tx1 312 and Tx2 326 can be implemented using a laser diode, and the Rx1 314 and Rx2 322 can be implemented using a photo diode.

The switch timing signal generation circuit 328 of the remote 320 generates a TDD switching signal to be used in the optical repeater by receiving a portion of an RF signal of downstream data generated by the Rx2 322 and provides the generated TDD switching signal to the electrical switch 324 and the optical switch 327. An internal configuration of the switch timing signal generation circuit 328 will be described in more detail with reference to FIG. 4.

Data transmission procedures of an uplink and a downlink using the components of the main donor 310 and the remote 320 will now be described in detail.

For the downlink, an RF signal transmitted via the RF cable from the AP 330, which is an upper layer, is input to the first LNA 311 of the main donor 310.

The first LNA 311 substantially cancels a noise component of the RF signal, amplifies a signal component of the RF signal, and outputs the noise-cancelled and signal-amplified RF signal to the Tx1 312. The Tx1 312 converts the input RF signal to an optical signal and outputs the converted optical signal to the first optical switch 313 used to distinguish upstream data from downstream data. The Tx1 312 can be implemented using a laser diode (LD) or light emitting diode (LED).

The first optical switch 313 transmits an input optical signal from the Tx1 314 or received the optical circulator 321 of the remote 320 via the optical fiber 340 by distinguishing the input signal as upstream data or downstream data in response to the TDD switching signal input from the AP 330, which time divides of the upstream and downstream data. That is, the first optical switch 313 selectively provides a path of the downstream or upstream data by controlling the opening or closing thereof in response to the TDD switching signal.

The downstream data received via the optical fiber 340 from the first optical switch 313 of the main donor 310 is input to the optical circulator 321 of the remote 320 and then transferred to the Rx2 322. The optical circulator 321 has first through third ports, wherein the first port is connected to the optical fiber 340, the second port is connected to the Rx2 322, and the third port is connected to the second optical switch 327.

The Rx2 322 optoelectric converts the input optical signal to an RF signal and outputs the converted RF signal to the second HPA 323. A portion of the RF signal of the downstream data converted by the Rx2 322 is input to the switch timing signal generation circuit 328 in order to generate a TDD switching signal to be used in the optical repeater. The Rx2 322 can be implemented using a common photo diode.

The second HPA 323 amplifies the input RF signal and outputs the amplified RF signal to the electrical switch 324, which is controlled by the TDD switching signal generated by the switch timing signal generation circuit 328. The amplified RF signal is then transferred to the antenna.

The electrical switch 324 operates according to a transmission time of the downstream data in response to the TDD switching signal input from the switch timing signal generation circuit 328 so that the downstream data is emitted via the antenna and transmitted to each terminal.

For the uplink, when an RF signal is received from a terminal to the electrical switch 324 via the antenna of the remote 320, the electrical switch 324 operates according to a transmission time of the upstream data in response to the TDD switching signal input from the switch timing signal generation circuit 328 so that the upstream data is transferred to the second LNA 325.

When the upstream data is input from the electrical switch 324, the second LNA 325 cancels a noise component of the upstream data, amplifies a signal component of the upstream data, and outputs the noise-cancelled and signal-amplified upstream data to the Tx2 326.

The Tx2 326 converts the RF signal of the upstream data to an optical signal and outputs the converted optical signal of the upstream data to the second optical switch 327. The Tx2 326 can be implemented using a common LD or LED in a manner similar to that of the Tx1 312.

When the optical signal is input from the Tx2 326, the second optical switch 327 operates according to a transmission time of the upstream data in response to the TDD switching signal input from the switch timing signal generation circuit 328 so that the upstream data is input to the optical circulator 321.

When the optical signal is input from the second optical switch 327, the optical circulator 321 transmits the input optical signal to the first optical switch 313 of the main donor 310 via the optical fiber 340.

The first optical switch 313, which has received the optical signal of the upstream data from the optical circulator 321 of the remote 320 via the optical fiber 340, outputs the received optical signal to the Rx1 314 in response to the TDD switching signal input from the AP 330, which time divides the upstream and downstream data.

The Rx1 314 optoelectric converts the optical signal of the upstream data input from the first optical switch 313 to an RF signal and outputs the converted RF signal to the first HPA 315. The Rx1 314 can be implemented using a common photo diode similar to Rx2 322.

The first HPA 315 amplifies the RF signal converted by the Rx1 314 up to an effective power sufficient to transmit it to the AP 330 via the RF cable.

As described above, a single optical repeater can be connected using a single wavelength by distinguishing upstream and downstream optical signals using the single wavelength bi-directional RoF link apparatus, which uses the TDD switching signals generated by the AP 330 and the switch timing signal generation circuit 328 of the remote 320, the first and second optical switches 313 and 327, and the optical circulator 321.

Figure 4:
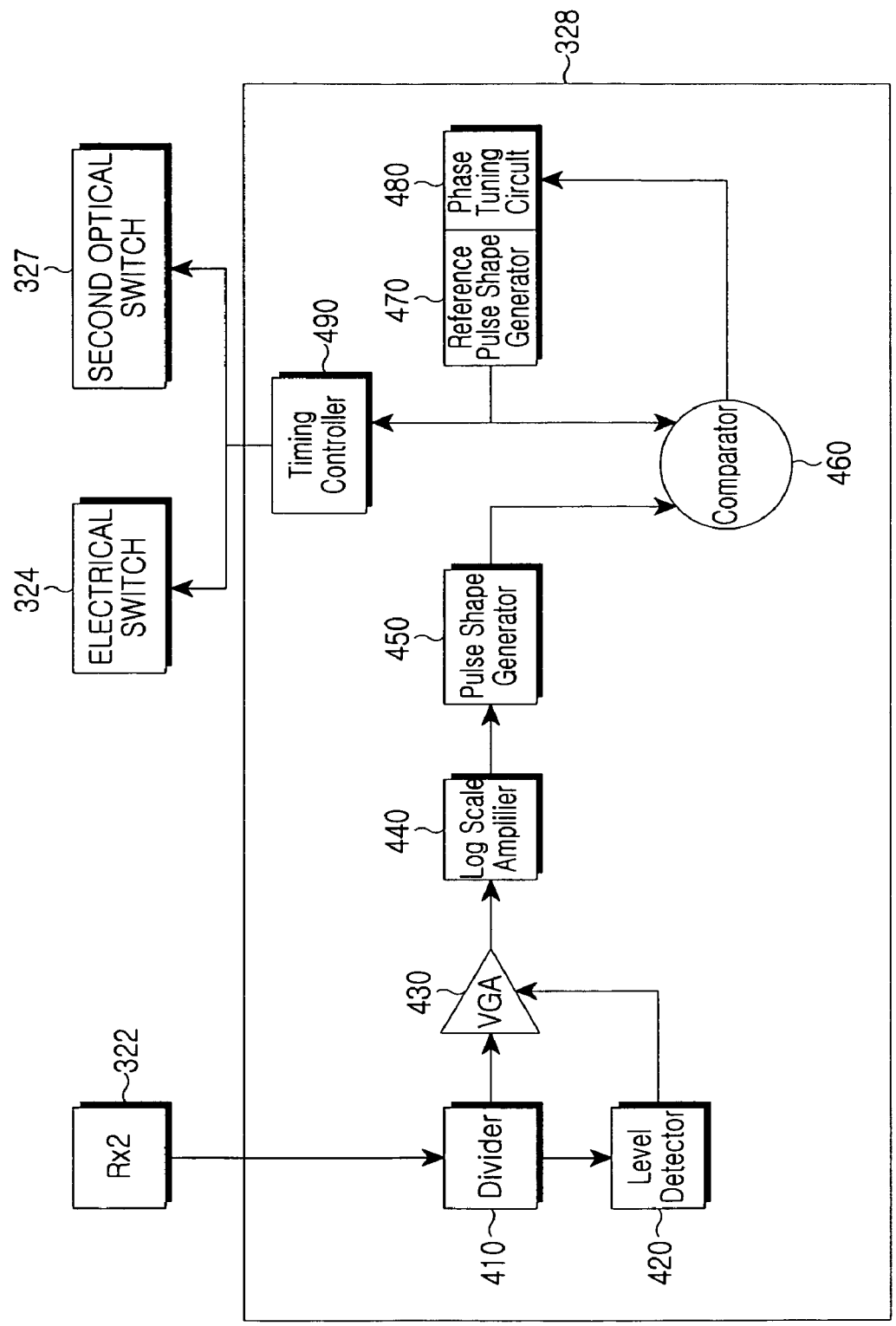
FIG. 4 is a block diagram of a switch timing signal generation circuit illustrated in FIG. 3.

FIG. 4 is a block diagram of the switch timing signal generation circuit 328 illustrated in FIG. 3.

Referring to FIG. 4, the switch timing signal generation circuit 328 includes a divider 410, a level detector 420, a variable gain amplifier (VGA) 430, a log-scale amplifier 440, a pulse-shape generator 450, a comparator 460, a reference pulse-shape generator 470, a phase tuning circuit 480, and a timing controller 490 as internal components.

A process of generating a TDD switching signal in the switch timing signal generation circuit 328 is now described in detail.

The Rx2 322 of the remote 320 extracts a portion of an RF signal and outputs the extracted RF signal to the divider 410. The divider 410 distributes the RF signal to the level detector 420 and the VGA 430. The level detector 420 measures a level of the RF signal and outputs the measured level to the VGA 430, and the VGA 430 maintains an output signal at a substantially constant level based on the measured level input from the level detector 420.

The log-scale amplifier 440 converts a signal variation input from the VGA 430 from a linear scale to a dB scale and outputs the scale-converted signal variation to the pulse-shape generator 450, and the pulse-shape generator 450 generates a pulse-shape signal using the input signal and outputs the generated pulse-shape signal to the comparator 460.

The reference pulse-shape generator 470 generates a reference pulse-shape signal for determining a frame start position of the RF signal by correlating with the pulse-shape signal generated by the pulse-shape generator 450 and outputs the generated reference pulse-shape signal to the comparator 460.

The comparator 460 performs a correlation between the pulse-shape signal input from the pulse-shape generator 450 and a reference pulse-shape signal input from the reference pulse-shape generator 470. That is, the comparator 460 correlates the two signals and outputs a correlation result to the timing controller 490. The timing controller 490 determines the frame start position of the RF signal extracted by the Rx2 322 by analyzing the correlation result provided by the comparator 460 and calculates start times of the downstream and upstream data based on the determined frame start position.

The timing controller 490 generates the TDD switching signal for controlling the electrical switch 324 and the second optical switch 327 using the calculated start time information of the downstream and upstream data and outputs the generated TDD switching signal to the electrical switch 324 and the second optical switch 327.

The phase tuning circuit 480 receives phase information of the pulse-shape signal generated by the pulse-shape generator 450 from the comparator 460 and tunes a phase of the reference pulse-shape signal.

If the switch timing signal generation circuit 328 generates the TDD switching signal through the above-described process and outputs the generated TDD switching signal to the electrical switch 324 and the second optical switch 327, the TDD switching signal distinguishes an RF signal input to the electrical switch 324 and an optical signal input to the second optical switch 327 as downstream data and upstream data. Thus, when downstream data is input from the second HPA 323 of the remote 320, the TDD switching signal controls the electrical switch 324 to output the downstream data to a terminal via the antenna, and when upstream data is input via the antenna, the TDD switching signal controls the electrical switch 324 and the second optical switch 327 to provide the upstream data to the optical circulator 321 via the second LNA 325 and the Tx2 326. That is, the electrical switch 324 and the second optical switch 327 can selectively provide a path for downstream or upstream data by controlling the opening and closing thereof in response to the TDD switching signal.

Figure 5:
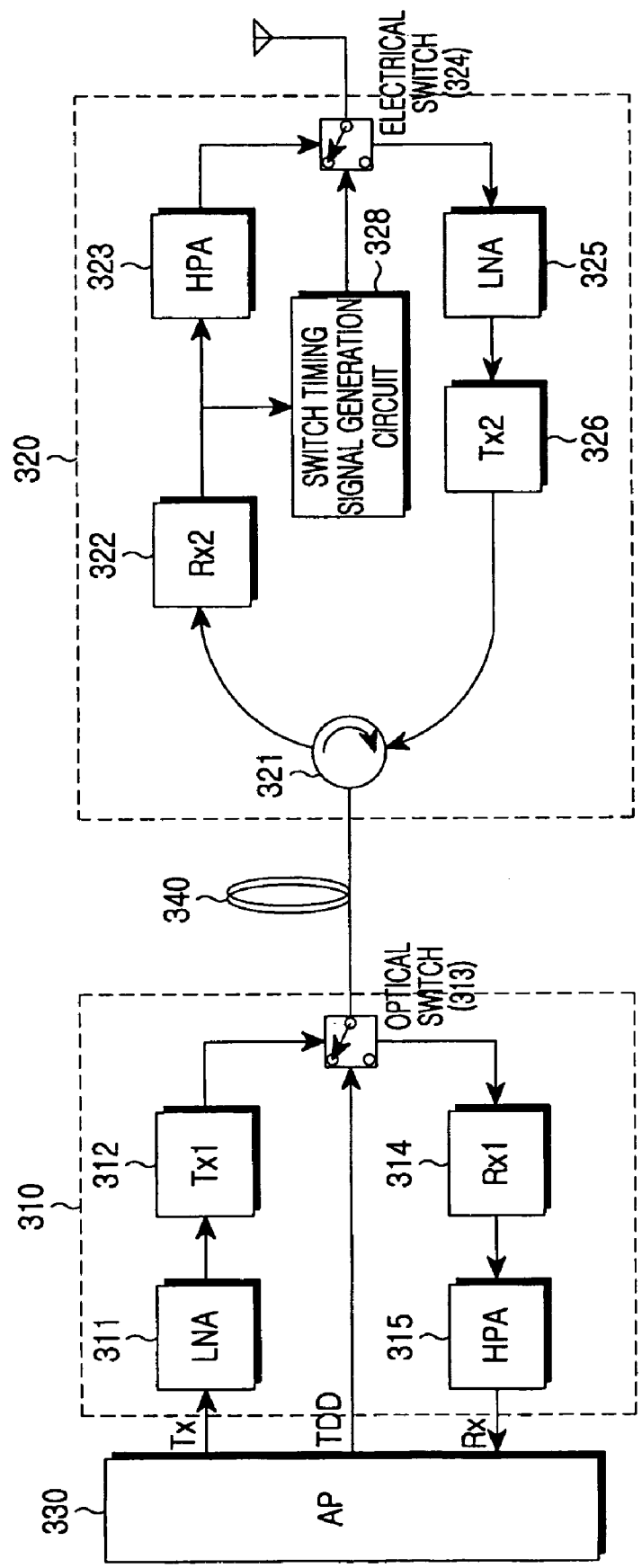
FIG. 5 is a block diagram of a single wavelength bi-directional RoF link apparatus for signal transmission in a TDD wireless system according to a second preferred embodiment of the present invention.

FIG. 5 is a block diagram of a single wavelength bi-directional RoF link apparatus for signal transmission in a TDD wireless system according to another preferred embodiment of the present invention.

The same elements of FIG. 5 as those of FIG. 3 are denoted by the same reference numerals.

Unlike the RoF link apparatus illustrated in FIG. 3, the RoF link apparatus illustrated in FIG. 5 does not include the second optical switch 327. In this embodiment of the invention, when the optical circulator 321 having good performance (isolation characteristic) is used, the second optical switch 327 existing next to the Tx2 326 can be removed.

Thus, in the current embodiment, when upstream data is input via the antenna, the upstream data is provided to the optical circulator 321 via the second LNA 325 and the Tx2 326 by controlling the opening and closing of the electrical switch 324, and besides, an operation and configuration of the RoF link apparatus illustrated in FIG. 5 is the same as the operation and configuration of the RoF link apparatus illustrated in FIG. 3.

The configuration of the RoF link apparatus according to the current embodiment will now be described. In this configuration, the main donor 310 includes a first LNA 311, a Tx1 312, a first optical switch 313, an Rx1 314, and a first HPA 315 as internal components, which are the same as those illustrated in FIG. 3.

The remote 320 includes an optical circulator 321, an Rx2 322, a second HPA 323, an electrical switch 324, a second LNA 325, a Tx2 326, and a switching timing signal generation circuit 328 as internal components.

Data transmission procedures of an uplink and a downlink using the components of the main donor 310 and the remote 320 according to the current embodiment will now be described in detail.

For the downlink, an RF signal transmitted via the RF cable from the AP 330, which is an upper layer, is input to the first LNA 311 of the main donor 310.

The first LNA 311 substantially cancels a noise component of the RF signal, amplifies a signal component of the RF signal, and outputs the noise-cancelled and signal-amplified RF signal to the Tx1 312. The Tx1 312 converts the input RF signal to an optical signal and outputs the converted optical signal to the first optical switch 313 used to distinguish upstream data from downstream data.

The first optical switch 313 transmits an input optical signal to the Tx1 314 or the optical circulator 321 of the remote 320 via the optical fiber 340 by distinguishing the input optical signal as upstream data or downstream data in response to the TDD switching signal input from the AP 330 for a time division of the upstream and downstream data. That is, the first optical switch 313 selectively provides a path for the downstream or upstream data by controlling the opening or closing thereof in response to the TDD switching signal.

The downstream data received via the optical fiber 340 from the first optical switch 313 of the main donor 310 is input to the optical circulator 321 of the remote 320 and then transferred to the Rx2 322. The optical circulator 321 has first through third ports, wherein the first port is connected to the optical fiber 340, the second port is connected to the Rx2 322, and the third port is connected to the Tx2 326.

The Rx2 322 opto-electric converts the input optical signal to an RF signal and outputs the converted RF signal to the second HPA 323. A portion of the RF signal of the downstream data converted by the Rx2 322 is input to the switch timing signal generation circuit 328 in order to generate a TDD switching signal to be used in the optical repeater.

The second HPA 323 amplifies the input RF signal up to an effective power enough to transmit it in a wireless manner and outputs the amplified RF signal to the electrical switch 324 controlled by the TDD switching signal generated by the switch timing signal generation circuit 328 and then transferred to the antenna.

The electrical switch 324 operates according to a transmission time of the downstream data in response to the TDD switching signal input from the switch timing signal generation circuit 328 so that the downstream data is emitted via the antenna and transmitted to each terminal.

For the uplink, when an RF signal is received from a terminal to the electrical switch 324 via the antenna of the remote 320, the electrical switch 324 operates according to a transmission time of the upstream data in response to the TDD switching signal input from the switch timing signal generation circuit 328 so that the upstream data is transferred to the second LNA 325.

When the upstream data is input from the electrical switch 324, the second LNA 325 cancels a noise component of the upstream data, amplifies a signal component of the upstream data, and outputs the noise-cancelled and signal-amplified upstream data to the Tx2 326.

The Tx2 326 electro-optic converts the RF signal of the upstream data to an optical signal and outputs the converted optical signal of the upstream data to the optical circulator 321.

When the optical signal is input from the Tx2 326, the optical circulator 321 transmits the input optical signal to the first optical switch 313 of the main donor 310 via the optical fiber 340.

When an optical signal of downstream data is input via the optical fiber 340, the optical circulator 321 transfers the input optical signal to the Rx2 322, and when an optical signal of upstream data is input from the Tx2 326, the optical circulator 321 transfers the input optical signal to the first optical switch 313 of the main donor 310 via the optical fiber 340.

The optical circulator 321 can be replaced by a directional coupler having an isolation function. The directional coupler can be implemented using a common optical combiner for combining optical signals and outputting the combined optical signal, e.g., a Y-branch waveguide or a 2×1 directional coupler.

The first optical switch 313, which has received the optical signal of the upstream data from the optical circulator 321 of the remote 320 via the optical fiber 340, outputs the received optical signal to the Rx1 314 in response to the TDD switching signal input from the AP 330 for time division of the upstream and downstream data.

The Rx1 314 optoelectric converts the optical signal of the upstream data input from the first optical switch 313 to an RF signal and outputs the converted RF signal to the first HPA 315.

The first HPA 315 amplifies the RF signal converted by the Rx1 314 and transmits the amplified RF signal to the AP 330 via the RF cable.

As described above, a single optical repeater can be connected using a single wavelength by temporally distinguishing upstream and downstream optical signals using the single wavelength bi-directional RoF link apparatus illustrated in FIG. 5, which uses the optical circulator 321 having good performance without using the second optical switch 327.

As described above, according to the present invention, by using a single wavelength bi-directional RoF link apparatus using a single wavelength to connect upstream/downstream wireless data to an optical repeater in a TDD mobile communication system, a low-price light source having a wide bandwidth without limitation in selection of wavelengths of upstream and downstream light sources for upstream and downstream data transmission can be used.

In addition, when a plurality of optical repeater signals are transmitted, only N wavelengths are required to transmit N optical repeater signals, and thus, more optical repeater signals can be carried on a single optical fiber.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A single wavelength bi-directional Radio over Fiber (RoF) link apparatus for signal transmission in a Time Division Duplexing (TDD) wireless system, the RoF link apparatus comprising:
a main donor comprising a receiving unit a transmission unit, the receiving unit for:
receiving a Radio Frequency (RF) signal of downstream data from an upper layer,
electro-optic converting the received RF signal to an optical signal, and
transmitting the converted optical signal via an optical fiber in response to a TDD switching signal received from an upper layer; and
the transmission unit for:
receiving an optical signal of upstream data via the optical fiber,
opto-electric converting the received optical signal to an RE signal in response to the TDD switching signal received from the upper layer, and
transmitting the converted optical signal to the main donor; and
a remote comprising a receiving unit and transmission unit, the remote receiving unit:
receiving the optical signal of the downstream data via the optical fiber from the main donor,
opto-electric converting the received optical signal to an RE signal, and
emitting the converted RF signal to a terminal via an antenna in response to a TDD switching signal generated by a switch timing signal generation circuit, and the remote transmission unit for
receiving an RF signal of upstream data from the terminal,
electro-optic converting the received RF signal to an optical signal in response to the TDD switching signal generated by the switch timing signal generation circuit, and
transmitting the converted optical signal to the main donor via the optical fiber;
wherein the remote comprises:
an optical circulator for receiving the optical signal of the downstream data via the optical fiber and the optical signal of the upstream data from an optical switch and controlling output paths of the optical signal of the downstream data and the optical signal of the upstream data;
an optical receiver (Rx2) for receiving the optical signal of the downstream data opto-electric converting the optical signal of the downstream data to an RF signal and outputting the converted RF signal;
a high power amplifier HPA for receiving the RF signal of the downstream data from the Rx2, amplifying the RF signal and transmitting the amplified RF signal;
a switch timing signal generation circuit for receiving a portion of the RE signal of the downstream data from the Rx2, generating a TDD switching signal, and outputting the generated TDD switching signal;
an electrical switch for receiving the RF signal of the downstream data from the HPA and the RF signal of the upstream data from the terminal and selectively providing a path of the RF signal of the downstream data or the RF signal of the upstream data by controlling the opening and closing thereof in response to the TDD switching signal generated by the switch timing signal generation circuit;
a low noise amplifier LNA, for receiving the RF signal of the upstream data from the electrical switch, substantially canceling a noise component of the RF signal, amplifying a signal component of the RE signal, and outputting the noise-cancelled and signal-amplified RF signal;
an optical transmitter (Tx2) for receiving the RF signal of the upstream data from the LNA, electrooptic converting the received RF signal to an optical signal, and outputting the converted optical signal; and an optical switch for receiving the optical signal of the upstream data from the Tx2 and providing the optical signal of the upstream data to the optical circulator by controlling the opening and closing thereof in response to the TDD switching signal generated by the switch timing signal generation circuit.

2. The RoF link apparatus of claim 1, wherein the upper layer is a base station of a mobile communication system, transmits data received from a Packet Access Router (PAR) to the terminal in a wireless manner, and has a low-power RF/Intermediate Frequency (IF) module and controller function, an Orthogonal Frequency Division Multiplexing (OFDM)/TDD packet scheduling and channel multiplexing function, a Media Access Control (MAC) frame variable control function according to a service characteristic and a radio wave environment, a 50 Mbps-level high-speed traffic real-time control function, and a handover function.

3. The RoF link apparatus of claim 1, wherein the main donor comprises:
   a first low noise amplifier (LNA) for receiving an RF signal of downstream data from the upper layer via an RF cable, canceling a noise component of the RF signal, amplifying a signal component of the RF signal, and outputting the noise-cancelled and signal-amplified RF signal;
   a first optical transmitter (Tx1) for receiving the RF signal from the first LNA, electrooptic converting the received RF signal to an optical signal, and outputting the converted, optical signal;
   a first optical switch for receiving an optical signal of downstream data from the Tx1 and an optical signal of upstream data via the optical fiber and selectively providing a path of the optical signal of the downstream data or the optical signal of the upstream data by controlling the opening and closing thereof in response to the TDD switching signal input from the upper layer;
   a first optical receiver (Rx1) for opto-electric converting the optical signal of the upstream data input from the first optical switch to an RF signal and outputting the converted RF signal; and
   a first high power amplifier (HPA) for amplifying the RE signal input from the Rx1 and transmitting the amplified RF signal to the upper layer via the RF cable.

4. The RoF link apparatus of claim 1, wherein the optical circulator is a directional coupler having an isolation function.

5. The RoF link apparatus of claim 4, wherein the directional coupler is selected from the group consisting of: an optical combiner, a Y-branch waveguide, and a 2×1 directional coupler.

6. The RoF link apparatus of claim 1, wherein the optical circulator is a directional coupler.

7. The RoF link apparatus of claim 3, wherein the Tx1 is selected from the group consisting of: a laser diode (LD) or light emitting diode (LED).

8. The RoF link apparatus of claim 3, wherein the Rx1 is a photo diode.

9. The RoF link apparatus of claim 1, wherein the Tx2 is selected from the group consisting of: a laser diode (LD) or light emitting diode (LED).

10. The RoF link apparatus of claim 1, wherein the Rx2 is a photo diode.

11. A device for use in a RoF network, the device comprising:
   an optical path controller for receiving an optical signal of a downstream data via an optical fiber and an optical signal of an upstream data and controlling output paths of the optical signal of the downstream data and the optical signal of the upstream data;
   an optical receiver (Rx2) for receiving the optical signal of the downstream data, converting the optical signal of the downstream data to an RE signal and outputting the converted RF signal;
   a high power amplifier (HPA) for receiving an RF signal of the downstream data from the Rx2, amplifying the RF signal and transmitting the amplified RF signal;
   a switch timing signal generation circuit for receiving a portion of the RF signal of the downstream data from the Rx2, generating a TDD switching signal, and outputting the generated TDD switching signal;
   an electrical switch for receiving the RF signal of the downstream data from the HPA and an RF signal of the upstream data and selectively providing a path for the RF signal of the downstream data and the RF signal of the upstream data by controlling the opening and closing thereof in response to the TDD switching signal generated by the switch timing signal generation circuit;
   a low noise amplifier (LNA) for receiving the RF signal of the upstream data from the electrical switch, amplifying a signal component of the RE signal, and outputting the signal-amplified RF signal;
   a optical transmitter (Tx2) for receiving the RF signal of the upstream data from the LNA, converting the received RF signal to an optical signal, and outputting the converted optical signal; and
   an optical switch for receiving the optical signal of the upstream data from the Tx2 and providing the optical signal of the upstream data to the optical path controller by controlling the opening and closing thereof in response to the TDD switching signal generated by the switch timing signal generation circuit.

12. The device of claim 11, wherein the optical path controller is a directional coupler having an isolation function.

13. The device of claim 11, wherein the optical path controller, is an optical circulator.

14. The device of claim 12, wherein the directional coupler is selected from the group consisting of: an optical combiner, a Y-branch waveguide, and a 2×1 directional coupler.

15. The device of claim 11, wherein the Tx2 selected from the group consisting of: a laser diode (LD) and light emitting diode (LED).

16. The device of claim 11, wherein the Rx2 is a photo diode.

* * * * *

UNITED STATES PATENT AND TRADEMARK OFFICE
CERTIFICATE OF CORRECTION

PATENT NO.        : 7,773,887 B2                                              Page 1 of 1
APPLICATION NO.   : 11/642260
DATED             : August 10, 2010
INVENTOR(S)       : Jae-Hoon Lee et al.

It is certified that error appears in the above-identified patent and that said Letters Patent is hereby corrected as shown below:

--Column 12, Claim 1, Line 47, should read as follows:
  --...portion of RF signal...--

--Column 12, Claim 1, Line 61, should read as follows:
  --...component of the RF signal...--

--Column 13, Claim 3, Line 41, should read as follows:
  --...amplifying the RF signal...--

--Column 14, Claim 11, Line 15, should read as follows:
  --...data to an RF signal...--

--Column 14, Claim 11, Line 33, should read as follows:
  n--...component of the RF signal...--

Signed and Sealed this

Ninth Day of November, 2010

David J. Kappos
*Director of the United States Patent and Trademark Office*